(12) United States Patent
Weixler et al.

(10) Patent No.: US 10,994,352 B2
(45) Date of Patent: May 4, 2021

(54) METHOD FOR THE GEAR MANUFACTURING MACHINING OF A WORKPIECE

(71) Applicant: Liebherr-Verzahntechnik GmbH, Kempten (DE)

(72) Inventors: Johannes Weixler, Durach (DE); Thomas Breith, Kempten (DE)

(73) Assignee: LIEBHERR-VERZAHNTECHNIK GMBH, Kempten (DE)

( * ) Notice: Subject to any disclaimer, the term of this patent is extended or adjusted under 35 U.S.C. 154(b) by 83 days.

(21) Appl. No.: 15/952,109

(22) Filed: Apr. 12, 2018

(65) Prior Publication Data

US 2018/0297135 A1 Oct. 18, 2018

(30) Foreign Application Priority Data

Apr. 13, 2017 (DE) ..................... 10 2017 003 648.9

(51) Int. Cl.
| | |
|---|---|
| B23F 13/00 | (2006.01) |
| B23F 19/10 | (2006.01) |
| B23F 5/16 | (2006.01) |
| B23F 21/00 | (2006.01) |
| B23F 1/06 | (2006.01) |
| B23F 5/22 | (2006.01) |
| B23Q 15/013 | (2006.01) |
| B23F 17/00 | (2006.01) |
| B23F 23/12 | (2006.01) |

(52) U.S. Cl.
CPC .............. *B23F 19/104* (2013.01); *B23F 1/06* (2013.01); *B23F 5/163* (2013.01); *B23F 5/22* (2013.01); *B23F 13/00* (2013.01); *B23F 21/005* (2013.01); *B23Q 15/013* (2013.01); *B23F 17/006* (2013.01); *B23F 23/1206* (2013.01)

(58) Field of Classification Search
CPC .......... B23F 19/104; B23F 1/06; B23F 13/00; B23F 21/005; B23F 5/22; B23F 5/163; B23F 23/1206; B23F 17/006; B23F 17/00; B23Q 15/013
See application file for complete search history.

(56) References Cited

U.S. PATENT DOCUMENTS

| 9,896,372 B2 | 2/2018 | Vogt et al. |
| 2012/0258647 A1 | 10/2012 | Geiser |

(Continued)

FOREIGN PATENT DOCUMENTS

| CN | 101513684 A | 8/2009 |
| CN | 102248226 A | 11/2011 |
| CN | 202317204 U | 7/2012 |

(Continued)

OTHER PUBLICATIONS

China National Intellectual Property Administration, Office Action and Search Report Issued in Application No. 201810333134.3, dated Jun. 3, 2020, 25 pages.

*Primary Examiner* — Rick K Chang
(74) *Attorney, Agent, or Firm* — McCoy Russell LLP

(57) ABSTRACT

The present disclosure relates to a method for the gear manufacturing machining of a workpiece in which a hobbing machining of the workpiece takes place to generate a gearing geometry of the workpiece, wherein the workpiece is gear manufacturing machined by gear skiving in addition to the hobbing machining.

20 Claims, 8 Drawing Sheets

(56) References Cited

U.S. PATENT DOCUMENTS

2013/0047390 A1\*  2/2013  Ongaro ................ B23F 17/006
                                                     29/27 C
2018/0079019 A1   3/2018  Heyn

FOREIGN PATENT DOCUMENTS

| | | |
|---|---|---|
| CN | 102791411 A | 11/2012 |
| CN | 204018886 U | 12/2014 |
| CN | 105458412 A | 4/2016 |
| DE | 19918289 A1 | 10/2000 |
| DE | 10305752 A1 | 10/2004 |
| DE | 102010041633 A1 | 3/2011 |
| DE | 102012105185 A1 | 12/2013 |
| DE | 102013212432 A1 | 12/2014 |
| DE | 102015120566 A1 | 6/2016 |
| DE | 102015104242 A1 | 9/2016 |
| DE | 102015104500 A1 | 9/2016 |
| DE | 102015120556 A1 | 9/2016 |
| DE | 202013012505 U1 | 1/2017 |
| DE | 202013012505 U1 | 3/2017 |
| EP | 2596893 A1 | 5/2013 |
| EP | 2823924 A2 | 1/2015 |
| WO | 2014206902 A1 | 12/2014 |
| WO | 2016150674 A1 | 9/2016 |
| WO | 2016150691 A1 | 9/2016 |

\* cited by examiner

METHOD FOR THE GEAR MANUFACTURING MACHINING OF A WORKPIECE

CROSS REFERENCE TO RELATED APPLICATION

The present application claims priority to German Patent Application No. 10 2017 003 648.9 entitled "Method for the Gear Manufacturing Machining of a Workpiece," filed Apr. 13, 2017, the entire contents of which are hereby incorporated by reference in their entirety for all purposes.

TECHNICAL FIELD

The present disclosure relates to a method for gear manufacturing machining of a workpiece, wherein a gearing of the workpiece is generated by a hobbing machine.

BACKGROUND AND SUMMARY

Hobbing is a machining process for gear cutting using a defined blade. The hobbing tool typically has a plurality of blade teeth that are arranged on the periphery of the hobbing tool. A cutting movement by which a machining material removal takes place at the workpiece is achieved by rotating the hobbing tool.

Hobbing machining therefore permits a high material removal and is typically used for manufacturing a gearing at a toothed or non-toothed blank of the workpiece. A surface geometry of the hobbed workpiece suffering from relatively high tolerances results from the blade geometry and from the feed movement of the tool for manufacturing the gearing, in particular in rough machining. A hobbing machining furthermore requires good accessibility of the gearing since specific free spaces have to be available for the first cut path and the overrun of the tool.

Due to the high tolerances of the surface geometry created in the work piece by hobbying, hobbing is typically used as a soft machining for manufacturing a gearing and is combined after hardening with a hard-fine machining such as grinding or honing by which the desired surface quality is ensured. If only small overruns are available with the desired gearing, a shaping method that makes different demands on overruns than a hobbing process is typically used instead of the hobbing process.

Further methods for gear manufacturing machining are known in addition to hobbing machining. One of these methods is gear skiving. In this process, a tool having a defined blade hobs over the workpiece with a scraping movement and is led along the workpiece in the width direction. Gear skiving has long been known as a method, but has at best a subordinate significance due to the high tool wear. Gear skiving processes in combination with methods for reworking the gearing are known from DE 103 05 752 A1, DE 10 2015 120 556 A1 and DE 10 2015 104 242 A1. Gear skiving, in a similar manner to gear shaping, manages with considerably smaller first cut paths and overruns than are required for hobbing The present disclosure comprises a method for the gear manufacturing machining of a workpiece in which a hobbing machining of the workpiece is used to generate a gearing geometry of the workpiece. The method in accordance with the disclosure is characterized in that the workpiece is additionally gear manufacturing machined by gear skiving in addition to the hobbing machining. Toothed workpieces can therefore be manufactured by the disclosed method. At least two machining steps are used for manufacturing the desired gearing geometry of the workpiece with the hobbing machining and the gear skiving.

The combined use of a hobbing machining and a gear skiving machining as disclosed herein allows the respective advantages of these processes to be combined with one another and/or to expand the workpiece geometries that can be at least partially manufactured by a hobbing machining.

The hobbing machining and the gear skiving take place by the same gear cutting machine. Costs and time in the manufacture of the toothed workpieces can hereby be saved.

Further, the hobbing machining and the gear skiving take place with the same fixing of the workpiece in a workpiece holder of the gear cutting machine. Since the workpiece remains in the workpiece holder for both machining steps, the cycle time required for the manufacturing is reduced.

Alternatively or additionally, a hobbing tool used for hobbing machining and a gear skiving tool used for gear skiving can be held in the same tool mount of the gear cutting machine and/or can be traveled through the axes of the same machining head of the gear cutting machine at least while carrying out the respective machining step. The construction effort and the costs for the gear cutting machine are hereby reduced.

In a first preferred variant, the hobbing tool and the gear skiving tool are fixed on the same tool arbor. The construction effort and the cycle time are hereby minimized since both machining steps can be carried out using only one tool holder without any tool change.

In a second variant, the gear cutting machine has two tool holders so that the hobbing tool and the gear skiving tool can be held in one tool holder each. A short cycle time is also hereby made possible since the necessity of a tool change is dispensed with. The two tool holders are arranged at a machining head and can therefore be traveled over the same travel axes of the gear cutting machine.

In a third variant, the gear cutting machine has an automatic tool changer for changing between the hobbing tool and the gear skiving tool. Only one tool holder is hereby required. Due to the increased cycle time, such a procedure rather presents itself for the manufacture of gearing arrangements with a longer machining time and smaller batch sizes.

In an embodiment, a feed movement of the respective tool in parallel with an axis of the workpiece holder takes place in the hobbing machining and/or in the gear skiving. This can in particular take place via a slide of the machining head of the gear cutting machine travelable in parallel with the axis of the workpiece holder.

In an embodiment, the rotary movement of the workpiece holder is coupled to the feed movement and/or to a rotary movement of the tool holder.

In an embodiment, the machining head of the gear cutting machine and in particular the tool holder in which the tool for hobbing machining and the tool for gear skiving are held and pivoted relative to the axis of the workpiece holder between the two machining steps. The different axial cross angles respectively required for the two machining steps can hereby be provided. The pivoting takes place about a pivot axis of the machining head extending perpendicular to the axis of the workpiece holder and/or tool holder.

The hobbing machining takes place at a first axial cross angle between the tool and the workpiece and the gear skiving machining takes place at a second axial cross angle between the tool and the workpiece, with the difference between the first and second axial cross angles amounting to more than 45°. Very different axial cross angles are hereby taken in account for the hobbing machining and for the gear skiving machining. The difference can in particular amount to more than 70°. The machining head is therefore pivoted about a corresponding pivot angle between the two machining steps.

Alternatively or additionally, the difference between the first and second axial cross angles can amount to less than 135°, less than 110°, further less than 100°.

Since such a pivot angle is not available on known hobbing machines, a gear cutting machine having a correspondingly large pivot region and specifically adapted to the carrying out of both a hobbing machining and a gear skiving machining is used.

The tool holder in which the tool for the hobbing machining and the tool for the gear skiving are held is shifted relative to the workpiece between the two machining steps. If both tools are fixed on the same arbor, the other tool can hereby be brought into engagement with the region of the workpiece to be machined.

The shifting takes place via a slide of the machining head supporting the workpiece holder travelable in parallel with the axis of rotation of the tool holder and/or via two axes of movement of a machining head supporting the workpiece holder fixing a plane perpendicular to the pivot axis.

In an embodiment, the hobbing machining takes place at the non-hardened workpiece. Alternatively or additionally, the hobbing machining is used at least for the rough machining of a gearing of the workpiece, in particular for the rough machining on a workpiece blank. The workpiece blank can have a rotationally symmetrical shape or a pre-gearing.

In an embodiment, the gear skiving machining can take place at the non-hardened workpiece. Alternatively or additionally, the gear skiving machining can at least be used for the finishing of a gearing. Depending on the embodiment, the gear skiving machining can be used for manufacturing a gearing on a workpiece blank or it can be used for finishing a gearing generated by the hobbing machining.

In a first variant, the hobbing machining and the gear skiving machining are used for manufacturing the same gearing. The hobbing machining can in particular be carried out for rough machining a gearing and consequently a gear skiving machining can be carried out at the toothed workpiece for finishing a gearing.

The terms rough machining and finishing of a gearing do not designate any absolute gearing qualities, but rather the relative gearing quality of the gearing geometry generated by the hobbing machining and the gear skiving, with the gearing quality generated by the hobbing machining being rougher or inferior with respect to the gearing quality generated by the gear skiving.

The first variant therefore combines the respective advantages of the hobbing machining and the gear skiving machining and avoids their respective disadvantages. The hobbing machining allows a high effective material removal, which then results in a tooth trace having large deviations from the ideal tooth trace due to the feed markings. The gear skiving generates a tooth trace with only small deviations due to different kinematics of engagement and small feeds, with the chip formation being associated with a high wear of the tool due to the different kinematics of engagement, in particular with the rough machining with a high material removal. The above-named problems are avoided since only the stock remaining after the hobbing machining thus has to be removed by the gear skiving, i.e. the material removal by the gear skiving is substantially reduced since the main cutting work is thus performed by the hobbing and the gearing quality is generated by the gear skiving.

In a second variant, the gearing manufactured in accordance with the present disclosure is a worm gearing. Such worm gearing arrangements were previously only able to be manufactured using complex and/or expensive special machinery. The methods disclosed in the present disclosure allow a substantially simpler manufacture and additionally provides a very high gearing quality.

The manufacture of the worm gearing in accordance with the second variant takes place by means of a method in accordance with the first variant so that the hobbing machining and the gear skiving machining are used after one another for manufacturing the worm gearing.

The method in accordance the second variant can in particular be used for manufacturing a drive element having a worm gearing of a steering drive of a vehicle.

In the first and/or second variant(s), the hobbing machining takes place by a disc-shaped profile cutter that rotates independently of the rotational movement of the workpiece holder.

The profile cutter is traveled in parallel with the axis of the workpiece holder during the hobbing machining while the workpiece is rotated about its axis such that the profile cutter generates a worm thread, with the hobbing machining taking place at an axial cross angle dependent on the lead angle of the worm gearing, with the axial cross angle approximately corresponding to the pitch angle.

In an embodiment of the first and/or second variant(s), the gear skiving takes place by a generating coupling between the gear skiving tool and the workpiece, with the gear skiving tool being traveled in parallel with the axis of the workpiece holder during gear skiving.

In accordance with the disclosure, the hobbing machining can be carried out at an axial cross angle between the hobbing tool and the workpiece in the range of +/−5° and +/−40°, in particular in the range of +/−10° and +/−20°.

The gear skiving machining can be carried out at an axial cross angle between the hobbing tool and the workpiece in the range from 90°+/−40°, in particular at an axial cross angle between the hobbing tool and the workpiece in the range of 90°+/−20°.

In a third variant, the hobbing gearing and the gear skiving machining are used for the manufacture of two different gearing arrangements of the workpiece.

Hobbing machining is in particular carried out for manufacturing a first gearing and a gear skiving machining is carried out for the manufacture of a second gearing. The first gearing has a larger diameter than the second gearing and/or forms an interference contour for the second gearing. Alternatively or additionally, workpiece contours in the proximity of one of the gearing arrangements to be machined can also represent an interference contour and can thus limit the machining capability of the gearing by means of hobbing methods.

The third variant of the present disclosure makes use of the fact that multiple gearing arrangements can be manufactured by the gear skiving that would no longer be able to be manufactured by a hobbing machining since the one gearing acts as an interference contour in the manufacturing of the other gearing by hobbing. A second gearing can in particular also be manufactured on the workpiece by gear skiving even if it has an only small axial distance from the first gearing. The hobbing machining for the first gearing therefore has the advantages of a high cutting efficiency. The relatively high wear of the gear skiving is accepted in contrast to be able to manufacture such workpieces at all, in particular without a change of machine.

In a fourth variant of the present disclosure, the gearing or gearing arrangements of the workpiece is/are one or more spur gearing arrangements.

The method in accordance with the disclosure can in particular be used for manufacturing a workpiece having a multiple gearing, in particular a shaft having at least two spur gearing arrangements arranged next to one another, in particular having different diameters. Alternatively or additionally, workpiece contours in the proximity of one of the gearing arrangements can represent an interference contour.

A method in accordance with the third variant in which the hobbing machining and the gear skiving machining are used for manufacturing two different gearing arrangements of the workpiece is used for manufacturing a workpiece having a plurality of spur gearing arrangements in accordance with the fourth variant.

In an embodiment of the third and/or fourth variant(s), the hobbing machining takes place by a hob whose rotational movement is coupled to the rotational movement of the workpiece holder, with the hob being traveled in parallel with the axis of the workpiece holder during the hobbing machining. A hob can, however, also be used in the first and/or second variant(s).

In an embodiment of the third and/or fourth variant(s), the gear skiving takes place by a generating coupling between the gear skiving tool and the workpiece, with the gear skiving tool being traveled in parallel with the axis of the workpiece holder during gear skiving.

The hobbing machining can be carried out at an axial cross angle between the hobbing tool and the workpiece in the range of 90°+/−45°, in particular in the range of 90°+/−35°.

The gear skiving machining can be carried out at an axial cross angle between the hobbing tool and the workpiece in the range of +/−45°, in particular in the range of 90°+/−35°.

An independent aspect further comprises a method for the gear manufacturing machining of a workpiece in which only a hobbing machining of the workpiece or a machining by gear skiving takes place such as has been presented within the framework of the above-described methods, in particular only a hobbing machining of the workpiece or a machining by gear skiving in accordance with at least one of the above-described variants.

The present disclosure describes a method for the manufacture of a workpiece having a worm geometry, wherein the manufacture of the worm geometry takes place by a hobbing machining of the workpiece. In one embodiment, the hobbing machining takes place by a profile cutter that rotates independently of the rotational movement of the workpiece holder. The profile cutter is traveled in parallel with the axis of the workpiece holder during the hobbing machining while the workpiece is rotated about its axis such that the profile cutter generates a worm thread.

The hobbing machining can take place at an axial cross angle dependent on the lead angle of the worm gearing, with the axial cross angle approximately corresponding to the lead angle.

Alternatively or additionally, the hobbing machining can be carried out with an axial cross angle between the hobbing tool and the workpiece in the range of +/−5° and +/−40°, in particular in the range of +/−10° and +/−20°.

The axial cross angle is set by a pivoting of a machining head of a gear cutting machine, in particular of a gear cutting machine such as will be described in more detail in the following.

Further described is a gear cutting machine in accordance with a first aspect for carrying out at least one method such as has been described above. The gear cutting machine is suitable for carrying out a method in a kinematic and/or technical control manner.

The gear cutting machine has a workpiece holder and a tool holder, with the tool holder being travelable over axes of movement of the gear cutting machine with respect to the workpiece holder. The tool holder is arranged at a machining head that is travelable over axes of movement of the gear cutting machine.

The control of the gear cutting machine is in particular designed such that at least one method as described herein can be carried out, with the carrying out taking place in an automated manner.

The gear cutting machine can in particular have a control for controlling the axes of movement of the gear cutting machine that has a function for carrying out at least one method as described herein, in particular a function for the automated carrying out of at least one method, in particular for manufacturing a plurality of identical toothed workpieces.

The control can further have functions for carrying out a plurality of the above-described alternative methods.

The functions of the control are implemented by code for controlling the axes of movement which runs on a microcontroller and/or processor of the control and which controls the axes of movement of the gear cutting machine such that it runs in an automated manner, on the gear cutting machine. An automated running does not require any intervention of a user in the control. The code can be stored in a memory of the control.

In a second, independent aspect, a gear cutting machine may have a workpiece holder and a tool holder that is travelable over axes of movement of the gear cutting machine with respect to the workpiece holder, with the tool holder being arranged at a machining head that is travelable over axes of movement of the gear cutting machine, with the machining head of the gear cutting machine having a pivot axis that stands perpendicular on the axis of the workpiece holder. The gear cutting machine is characterized in that the pivot axis has a pivot angle range of more than 90° and/or a pivot angle range that permits both a parallel and a perpendicular arrangement of the axis of rotation of the tool holder with respect to the axis of rotation of the workpiece holder.

The gear cutting machine in accordance with the second aspect is particularly suitable, kinematically suitable, to carry out a method described herein due to the large pivot angle range. The control does not necessarily have to have a function for carrying out a method described herein. The kinematic design, however, permits the control to be retrofitted and with corresponding function by new software and then the use of the gear cutting machine for carrying out a method described herein.

Alternatively or additionally, the gear cutting machine in accordance with the second aspect can be used for carrying out the hobbing machining such as has been described in more detail above, within the framework of the method described herein, in particular the hobbing machining in accordance with the above-described second variant, i.e. for manufacturing a worm gearing or a worm geometry. The gear cutting machine in accordance with the second aspect can in particular have a function for carrying out such a method, in particular for the automated carrying out.

The pivot axis has a pivot angle range of more than 110°, further of more than 130°. Alternatively or additionally, the pivot axis can have a pivot angle range that allows to pivot the axis of the tool holder in a range from −20° to +90° relative to the axis of the workpiece holder, in particular a range from −30° to +100° relative to the axis of the workpiece holder.

The gear cutting machine in accordance with the second aspect is designed in accordance with the first aspect and has the control and/or function described there.

The present disclosure further comprises software for controlling a gear cutting machine, in particular for controlling a gear cutting machine in accordance with the above-described first or second aspects having a function for carrying out at least one method described herein.

The software can in particular have a function for the automated carrying out of a method in accordance with the disclosure, in particular for manufacturing a plurality of toothed workpieces.

The software has code for controlling the axes of movement that can run on a microcontroller and/or processor of the control of a gear cutting machine and that controls the axes of movement of the gear cutting machine such that a method in accordance with the disclosure is carried out on the gear cutting machine and runs in an automated manner. An automated running does not require any intervention of a user in the control. The code can be stored in a memory of the control. The software comprises code for controlling the gear cutting machine to perform a hobbing machining of the workpiece to generate a gearing geometry of the workpiece, and code for controlling the gear cutting machine to further perform a gear skiving of the gearing geometry of the workpiece. The software may further comprise code to control the gear cutting machine to further perform the steps of the manufacturing process described herein. In an embodiment, the software may comprise code to control a pivot axis of the gear cutting machine to pivot a machining head of the gear cutting machine between the steps of hobbing machining and gear skiving.

The software is stored in a memory and/or on a memory medium.

The gear cutting machine has respective drives, in particular NC drives, for generating a rotational movement of the workpiece holder and of the tool holder about their respective axes of rotation.

The gear cutting machine has one or more linear axes, in particular NC linear axes for generating a relative movement between a tool held in the tool holder and a workpiece held in the workpiece holder.

The linear axes comprise a linear axis X1 for changing the axial spacing between the axes of rotation of the workpiece holder and of the tool holder. The linear axis X1 stands perpendicular on the axes of rotation of the workpiece holder and/or of the tool holder.

The linear axes comprise a linear axis Z1 for traveling the tool holder in parallel with the axis of rotation of the workpiece holder. The linear axis Z1 stands perpendicular on the linear axis X1.

The linear axes comprise a linear axis V1 for traveling the tool holder in parallel with its axis of rotation. Alternatively or additionally, a linear axis Y1 can be provided for traveling perpendicular to the linear axes X1 and Z1.

The pivot axis A1 stands perpendicular on the linear axes X1 and Z1 and allows a pivoting of the V1 axis.

The present invention will now be explained in more detail with reference to embodiments and to drawings.

DETAILED DESCRIPTION

Figure 1:
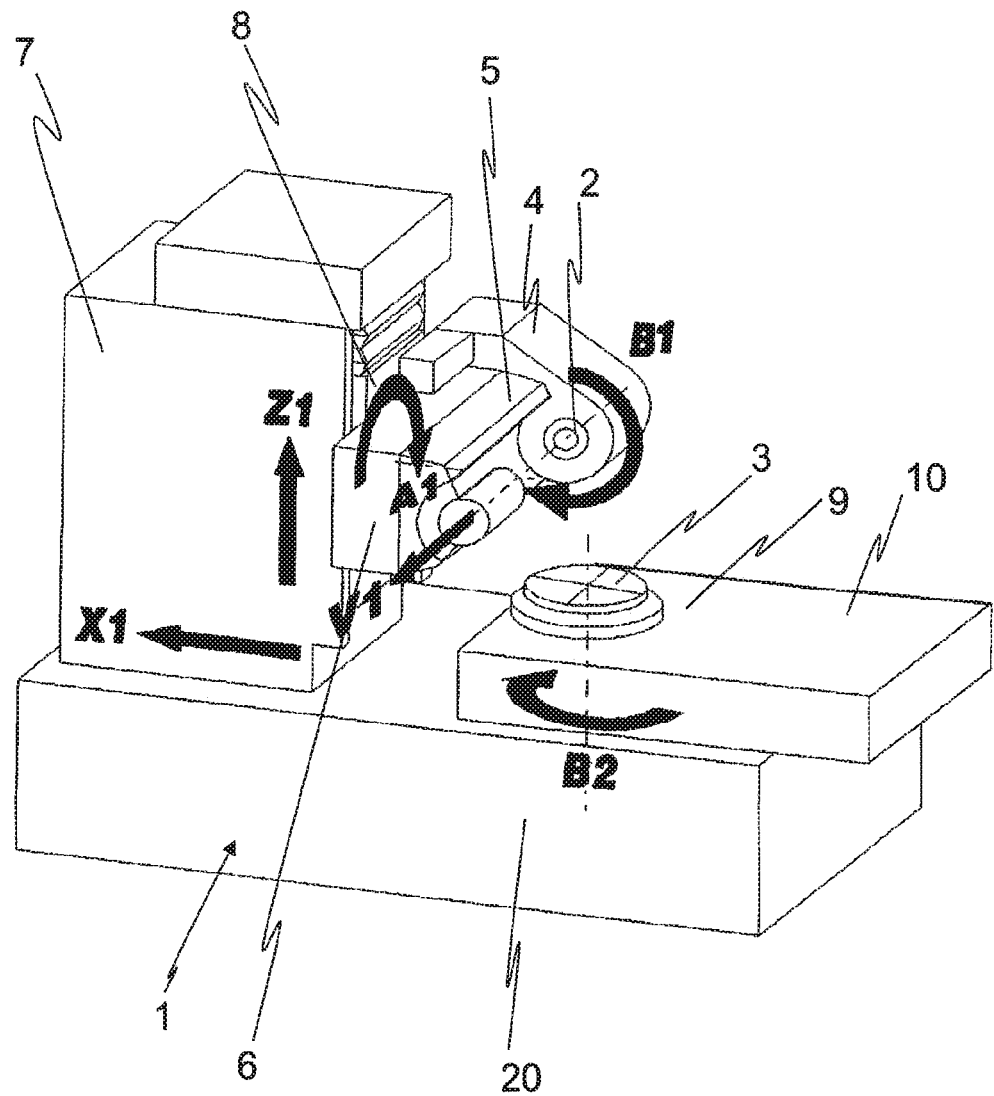
FIG. 1 is a schematic diagram of an embodiment of a gear cutting machine with the relevant machine axes.

FIG. 1 shows an embodiment of a gear cutting machine as described herein The gear cutting machine 1 has a tool holder 2 that is arranged at a machining head 4 of the gear cutting machine and is movable relative to a workpiece holder 3 via machine axes of the gear cutting machine.

The tool holder 2 has a tool spindle in which one or more tools arranged at a tool arbor can be fixed. The tool holder 2 has an axis of rotation B1 that can be set into rotation by a corresponding drive of the gear cutting machine. The tools can be unilaterally supported in the tool holder in a first embodiment. The tool holder 2, however, has a counter-bearing so that the tool arbor supporting the tools is arranged in the tool holder 2 supported at two sides.

The workpiece holder 3 allows the holding of workpieces to machine them by tools held in the tool holder 2. The workpiece holder 3 has an axis of rotation B2 by which the workpiece holder 3 can be set into rotation via a drive of the gear cutting machine. The workpiece holder 3 is arranged at a machine table 9 above the axis of rotation B2. The workpiece holder 3 permits a unilateral support of the workpieces in a first embodiment. The workpiece holder 3, however, also has a counter-bearing so that the workpieces are supported at two sides in the workpiece holder 3.

In FIGS. 2 to 10, the counter-bearings 2' and 3', respectively, of the tool holder 2 and the workpiece holder 3, that are not shown in FIG. 1, are shown in addition to the components described with respect to FIG. 1. The tailstock 3' of the workpiece holder 3 is arranged at a tailstock arm 12 of the gear cutting machine that is not shown in FIG. 1. The tailstock arm permits a travel of the tailstock 3' of the workpiece holder 3 in parallel with the axis of rotation B2 to be able to machine workpieces of different widths and to be able to change the workpieces fast. The counter-bearing 2' of the tool holder 2 is arranged at the machining head 4 and can be adapted to tools of different widths by traveling in parallel with the direction of the tool axis.

A machine column 7 having the machining head 4 is provided on the machine bed 20. The machine column 7 is travelable via a linear axis X1 by which the axial spacing between the axis of rotation B1 of the tool holder and the axis of rotation B2 of the workpiece holder 3 is variable. The linear axis X1 for this purpose runs perpendicular to a plane defined by the direction of the axes of rotation B1 and B2.

A guide 8 is provided at the machine column 7 and a slide 6 of the machining head 4 is travelable along it. The machining head can hereby be traveled along a linear axis Z1 that extends in parallel with the axis of rotation B2 of the workpiece holder 3.

The machining head 4 with the tool holder 2 is arranged at the slide 6 via a pivot axis A1. The pivot axis A1 extends in parallel with the linear axis X1 and/or stands perpendicular on a plane spanned by the directions of the axes of rotation B1 and B2. The pivot axis A1 particularly intersects the axes of rotation B1 and B2 of the tool holder 2 or workpiece holder 3.

The machining head 4 in accordance with the embodiment furthermore has a slide 5 that provides a linear axis V1 via which the tool holder 2 can be shifted in the direction of its axis of rotation B1. In the embodiment, the pivot axis A1 is arranged between the two linear axes Z1 and V1.

Alternatively to the embodiment shown having a shift axis V1, it would be conceivable to provide an axis Y1 via which the machine column 7 and/or the slide 6 would be travelable in a direction perpendicular to the linear axes X1 and Z1. A travel movement in the direction of the axis of rotation B1 of the tool holder 2 could then be generated by a superposition of linear movements of the axes Z1 and Y1.

A counter-column for holding the tailstock can, for example, be installed on the table frame 10, but also other automation devices for changing the workpieces or another link to an automation system can be arranged.

Other mechanical embodiments of the gear cutting machine are likewise conceivable for providing the above-describes axes of rotation, linear axes and pivot axes.

In typically hobbing processes, an axial cross angle required for the manufacture of helical gearing arrangements is provided between the axes of rotation B1 and B2 by the pivoting about the pivot axis A1. In hobbing machines known from the prior art, the pivot axis A1 therefore typically has a pivot angle range of +/−45° about a pivot position in which the axis of rotation B1 of the tool holder 2 stands perpendicular on the axis of rotation B2 of the workpiece holder 3.

In accordance with a first aspect of disclosed herein, the pivot axis A1 of the gear cutting machine in contrast has a pivot angle range that permits a pivoting of the axis of rotation B1 of the tool holder 2 from a position perpendicular to the axis of rotation B2 of the workpiece holder 3 into a position in parallel with the axis of rotation B2 of the workpiece holder 3. Alternatively or additionally, the pivot angle range is greater than 90°. For example, the pivot angle range can comprise a range from −20° to +100° with respect to a position of the axis of rotation B1 that stands perpendicular on the axis of rotation B2. In the embodiment, the pivot angle range amounts, for example to −45° to +110° with respect to the position of the axis of rotation B1 that stands perpendicular on the axis of rotation B2.

The larger pivot angle range of the A1 axis can be used to carry out both a hobbing method and a gear skiving method by means of the same machining head at a workpiece held in the workpiece holder 3. The hobbing tool or gear skiving tool used for this purpose can be held in the tool holder 2 for this purpose. The hobbing tool and the gear skiving tool are fixed on an arbor and are held together in the tool holder 2. The very different axial cross angles required for both the hobbing machining and for the gear skiving machining can be provided by the large pivot angle range of the pivot axis A1.

In accordance with a second aspect, the control of the gear cutting machine is designed such that one of the gear cutting methods described in the following can be carried out on the machine. The control has a function for the automatic carrying out of one of the gear cutting methods described in the following for this purpose. A plurality of identical workpieces can be manufactured in an automated manner on the gear cutting machine by this function.

A gear cutting machine in accordance with the second aspect has the pivot angle range in accordance with the first aspect. Alternative construction designs of the gear cutting machine in accordance with the second aspect are likewise conceivable, however.

In the following, a first embodiment and a second embodiment will be described in more detail. Both embodiments of the methods will be described with reference to the embodiment of a gear cutting machine shown in FIG. 1. The methods described herein can, however, also be carried out with an alternative mechanical design of the gear cutting machine.

It is common to both embodiments of the method described herein that both a hobbing machining and a gear skiving machining of the workpiece takes place on the gear cutting machine. In the embodiment, both the hobbing machining and the gear skiving take place using the same fixing of the workpiece in the workpiece holder 3. Furthermore, in the embodiment, a hobbing tool and a gear skiving tool are used that are held in the tool holder 2 of the gear cutting machine and that are traveled via the axes of movement of the machining head 4. In accordance with the preferred embodiment shown in the following, the hobbing tool and the gear skiving tool are fixed on the same tool arbor and are therefore held together in the tool holder 2. Alternatively, the use of an automatic tool changer for changing the tools between the two machining steps or the use of two tool holders at the machining head 4 would be conceivable.

In the first embodiment of the method shown with reference to FIGS. 2 to 5, the hobbing machining and the gear skiving are used in a first aspect for machining the same toothed region of the workpiece 15. The gearing is pre-machined here via the rough machining by means of the hobbing tool 13 while a finishing by which the tolerances of the surface geometry are reduced is carried out by means of the gear skiving tool 14.

The first embodiment therefore combines the strengths of hobbing machining and of gear skiving and balances the respective weaknesses of these methods. The hobbing machining permits high cutting performances with relatively low tool wear, but has the disadvantage with large tool feeds of the low quality of the surface geometry. A high quality of the surface geometry can be achieved by the gear skiving. The high wear of the tool during gear skiving is compensated by the fact that only the stock still left as part of the hobbing machining or rough machining has to be removed by the gear skiving, such that the required cutting performance and thus also the wear of the gear skiving tool is correspondingly reduced.

In accordance with the first embodiment, the hobbing tool is used to generate a gearing in a first machining step. This gearing can be generated from the non-hardened workpiece blank by the hobbing machining. In a second step, this gearing is then further machined by the gear skiving and a high quality of the surface geometry is hereby achieved. The gear skiving also takes place at the non-hardened workpiece.

The machining head 4 is pivoted with the tool holder 2 about the A1 axis between the hobbing machining step and the gear skiving step to provide the axial cross angles, that are required for the hobbing machining and the gear skiving machining, between the axis of rotation B1 of the tool holder 2 and the axis of rotation B2 of the workpiece holder 3.

In the first embodiment of the method as shown with reference to FIGS. 2 to 5, a worm gearing is generated on the workpiece 15 in a second aspect. For example, the workpiece 15 can be a drive element of a steering drive of a vehicle. Such drive elements are in particular used with steer-by-wire steerings in which the steering movement of the steering wheel is detected via a sensor and is used for the electronic control of the steering drive.

Figure 2:
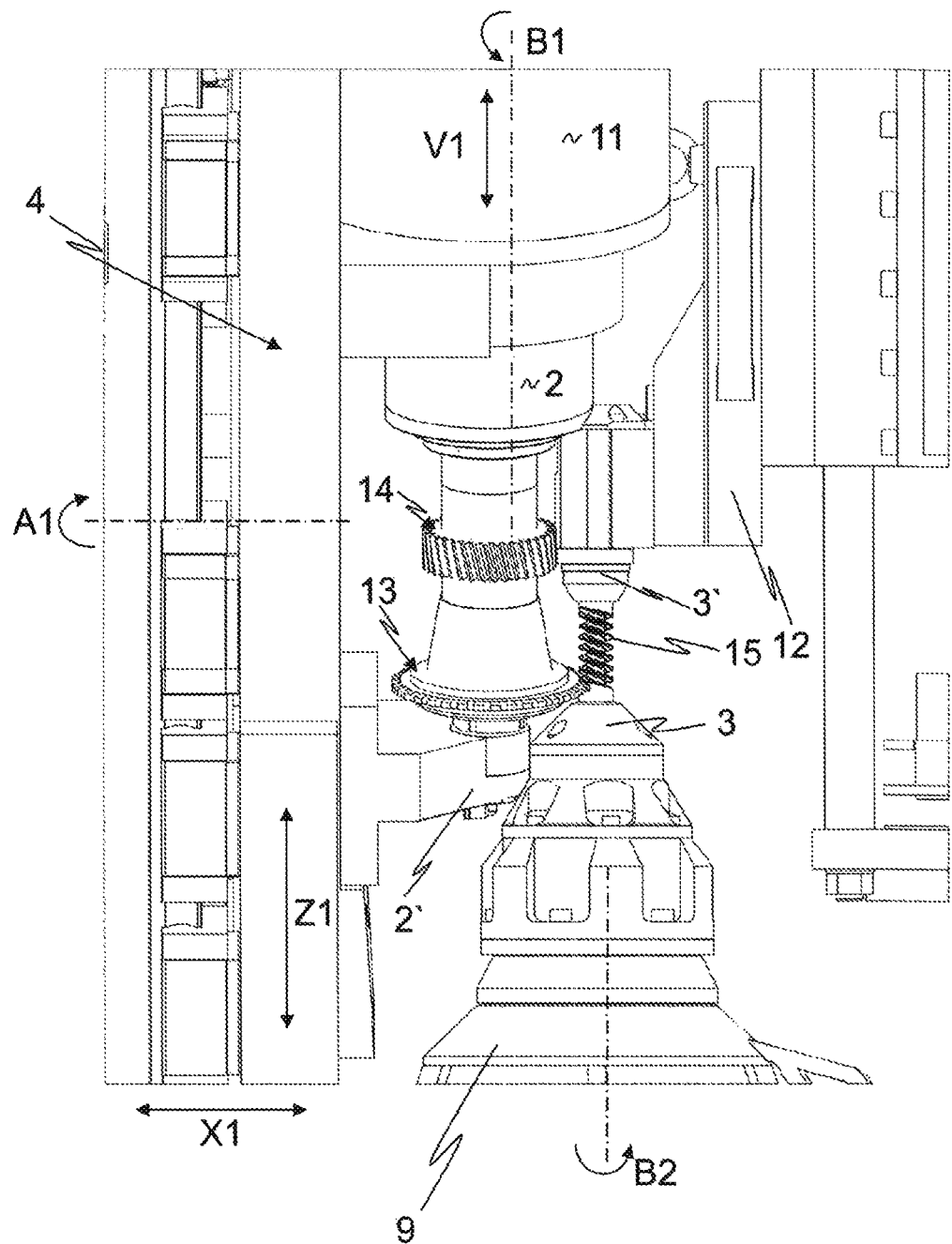
FIG. 2 depicts a hobbing machining in a first embodiment in a side view.

The hobbing machining step in the first embodiment is shown in FIG. 2. A profile cutter that has a plurality of cutting teeth at its outer periphery that respectively have an identical axial and radial position and that are arranged in the peripheral direction can be used as the hobbing tool 13 in the embodiment.

The tool holder 2 in which the hobbing tool 13 is clamped is pivoted via the A1 axis in dependence on the desired lead angle of the worm geometry of the workpiece 15 with respect to the axis of rotation B2 of the workpiece holder 3. The axial cross angle between the axes of rotation B1 and B2 for this purpose in particular approximately corresponds to the desired lead angle so that the plane defined by the profile cutter approximately corresponds to the pitch of the thread of the worm geometry generated by the hobbing tool 13.

The hobbing tool 13 rotates about the axis B1 to generate the worm geometry. The rotational movement of the tool 13 about the axis of rotation B1 here only serves the material removal and does not therefore have to be coupled with the rotational movement of the workpiece 15 about the axis B2.

After the corresponding delivery of the hobbing tool 13 to the workpiece 15 via the X1 axis, a travel movement of the machining head takes place in parallel with the axis of rotation B2 of the workpiece holder 3, in particular via the Z1 axis. A rotational movement of the workpiece 15 about the B2 axis of the tool holder 3 is coupled hereto so that a worm thread is generated by the superposition of the movement in parallel with the B2 axis and the rotational movement about the B2 axis. The length of the travel movement in parallel with the axis of rotation B2 therefore corresponds to the width of the worm geometry to be generated. If the worm geometry has a plurality of threads, a plurality of machining steps having a starting point displaced in the Z1 direction or in the direction of rotation are necessary.

The manufacture of a thread of the worm geometry by the hobbing machining can take place in one or more work strokes. If a plurality of work strokes are used, the axial spacing can be reduced between the individual work strokes, in particular by a further delivery of the tool via the X1 axis in order thus to distribute the total required material removal over a plurality of work strokes.

In one aspect, the worm geometry of the workpiece is manufactured by the hobbing machining. In this case, the pivot angle range of the A1 axis only has to be able to provide the large axial cross angles required for the hobbing machining, for example by a pivot angle range of the A1 axis that at least comprises a range of +/−15° about an axial cross angle of 90°.

Figure 3:
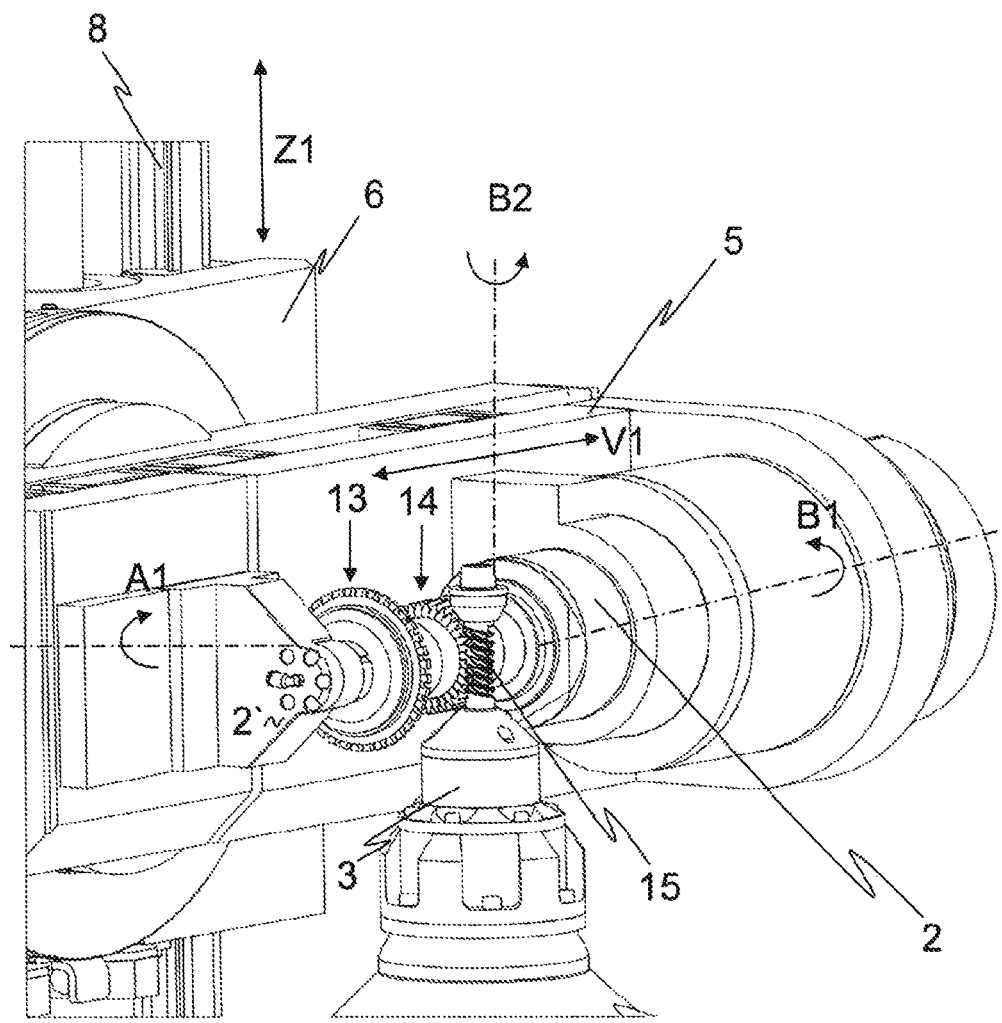
FIG. 3 depicts a gear skiving machining in the first embodiment in a perspective view.
Figure 4:
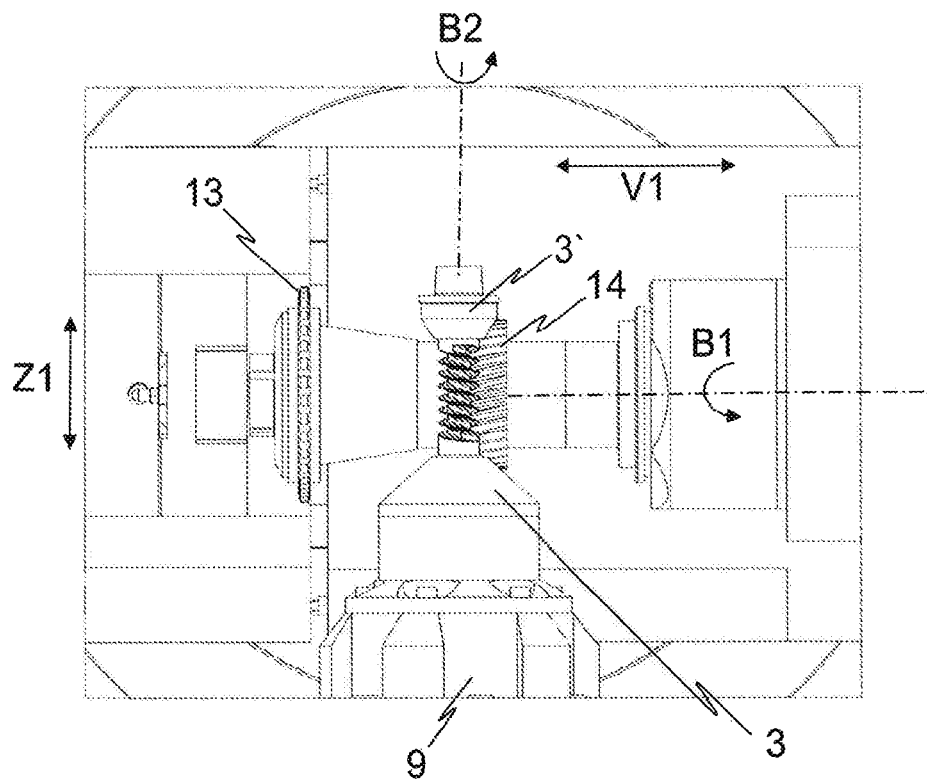
FIG. 4 depicts the gear skiving machining of the first embodiment shown in FIG. 3 in a front view.
Figure 5:
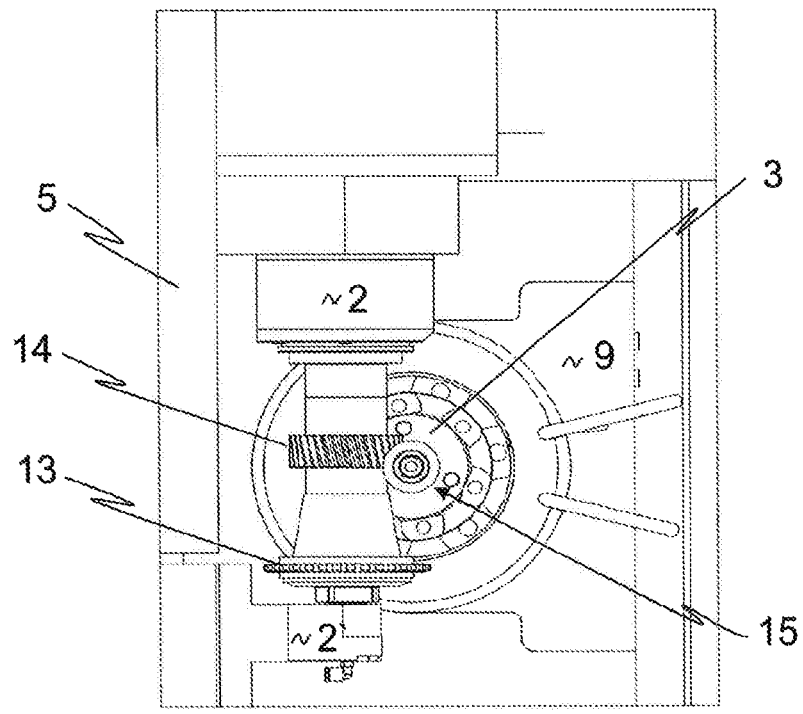
FIG. 5 depicts the gear skiving machining of the first embodiment shown in FIGS. 3 and 4 in a plan view.

In accordance with the first embodiment, however, the gearing generated by the hobbing tool, in particular the worm geometry, is reworked by means of the gear skiving tool 14 in a second machining step. This second machining step is shown in FIGS. 3 to 5.

To carry out the gear skiving, a pivoting of the machining head takes place about the A1 axis to provide the axial cross angle that is required for the gear skiving, between the rotational axes B1 and B2. In addition, a shift movement of the tool holder 2 takes place, in particular via the V1 axis, in order now to bring the gear skiving tool 14 held in the tool holder 2 axially offset from the hobbing tool 13 into engagement with the worm geometry.

The gear skiving machining takes place by a rotation of the gear skiving tool about the axis of rotation B1 coupled with the rotation of the workpiece 15 about the axis of rotation B2. The machining head is furthermore traveled along the width of the worm geometry via the Z1 axis in parallel with the B2 axis of the workpiece holder 3.

The lead angle of the worm geometry amounts to between 5° and 40°, further between 10° and 20°. The change of the axial cross angle between the axes B1 and B2 and thus the pivot movement of the pivot axis A1 between the hobbing machining step and the gear skiving step amounts to more than 50° and can, for example, be in the range between 50° and 130°, in particular in the range between 60° and 120°.

Since a worm geometry is generated, the axial cross angle in gear skiving approximately corresponds to that axial cross angle that is otherwise required for hobbing spur gearing arrangements. A gear cutting machine adapted for hobbing machining can therefore be used for gear skiving of a worm geometry. The gear cutting machine can, as described above, also be used to hob the worm gearing due to the larger pivot angle that is available.

In the first embodiment, in which the hobbing machining is used for generating a gearing that is then finished via the gear skiving can, however, also be used for generating spur gearing arrangements. The method steps are the same that were shown with respect to the already described embodiment. Only the axial cross angles differ from the described embodiment and are displaced by approximately 90° with respect to the described embodiment.

Instead of a profile cutter, in a possible alternative embodiment, the first embodiment is carried out using a hob. In this case, the method only differs from the method shown to the extent that the rotational movement of the tool axis B1 is also coupled with the rotational movement of the workpiece B2 in this hob. The use of a hob is in particular recommended in the manufacture of spur gear arrangements.

A second embodiment will now be described in more detail with reference to FIGS. 6 to 10.

The hobbing machining and the gear skiving machining are used in this embodiment in accordance with a first aspect for manufacturing different gearing arrangements 17 and 18 of the same workpiece 16. This aspect of the second embodiment makes use of the fact that gear arrangements can also be generated by the gear skiving that would not be able to be manufactured within the framework of hobbing due to interference contours.

The second embodiment can in particular be used to manufacture a first gearing 17 with a larger diameter by a hobbing machining and a second gearing 18 with a smaller diameter or with an interference contour relevant to the gearing machining by a gear skiving machining. In this case, the higher wear of the gear skiving tool is accepted in order to achieve a manufacturing capability of the workpiece at all on only one machine. In accordance with the prior art, in contrast, if the larger gearing 17 is to be manufactured by a gearing hobbing, the workpiece would have to be changed to a different machine to manufacture the smaller gearing 18 by a shaping process. In contrast, the methods described herein allow the manufacture of such a workpiece in one machine and in one fixture by the combination of a hobbing machining and a gear skiving machining.

The two gearing arrangements 17 and 18 on the workpiece 16 are arranged axially offset at the workpiece 16 in the embodiment. They can be positioned so closely next to one another that the manufacture of the gearing 18 with a smaller diameter is no longer possible by means of hobbing machining since a hob used for manufacturing the gearing 18 would damage the gearing 17 having a larger diameter.

A one-sided or two-sided axial interference contour can in contrast be arranged considerably closer to the gearing for the gear skiving, as with a hobbed gearing, since the gear skiving method requires a considerably smaller overrun to manufacture the gearing so that it can be used for manufacturing the gearing 18.

In a second aspect, the second embodiment is used for the manufacture of spur gearing arrangements 17 and 18. The spur gearing arrangements can be straight gearing arrangements or helical gearing arrangements.

Figure 6:
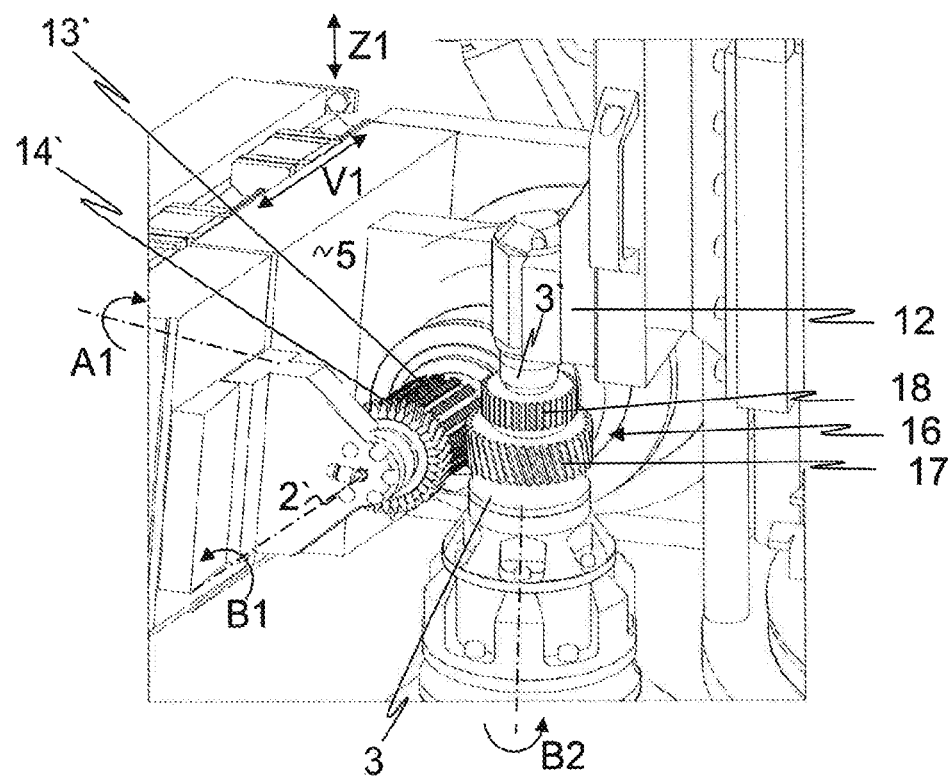
FIG. 6 depicts a gear hobbing machining in a second embodiment in a perspective view.
Figure 7:
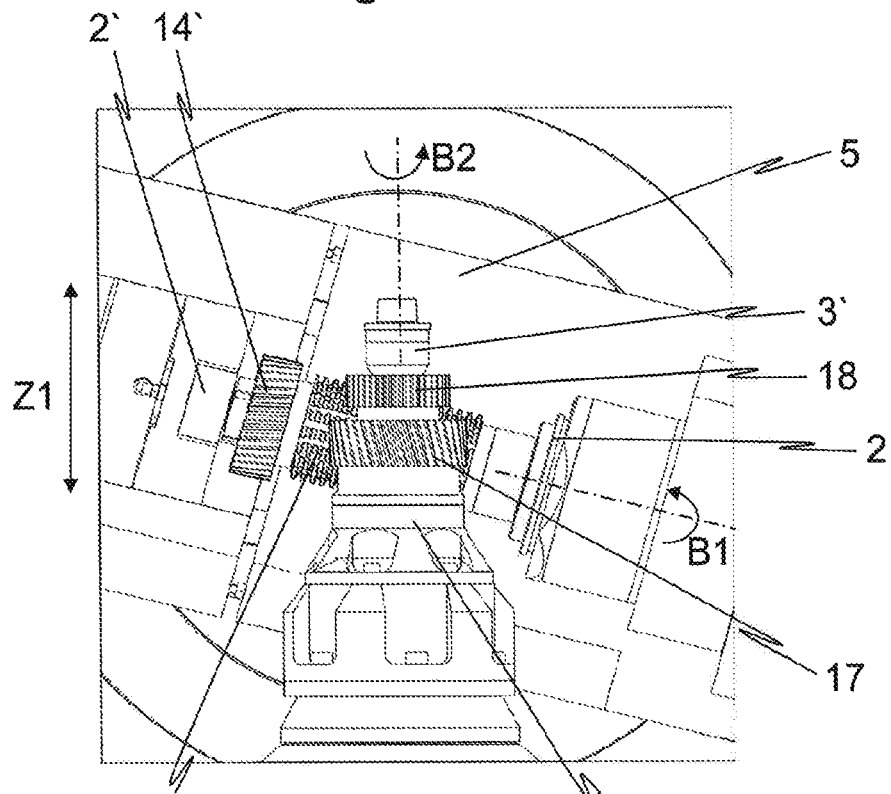
FIG. 7 depicts the gear hobbing machining of the second embodiment shown in FIG. 6 in a front view.
Figure 8:
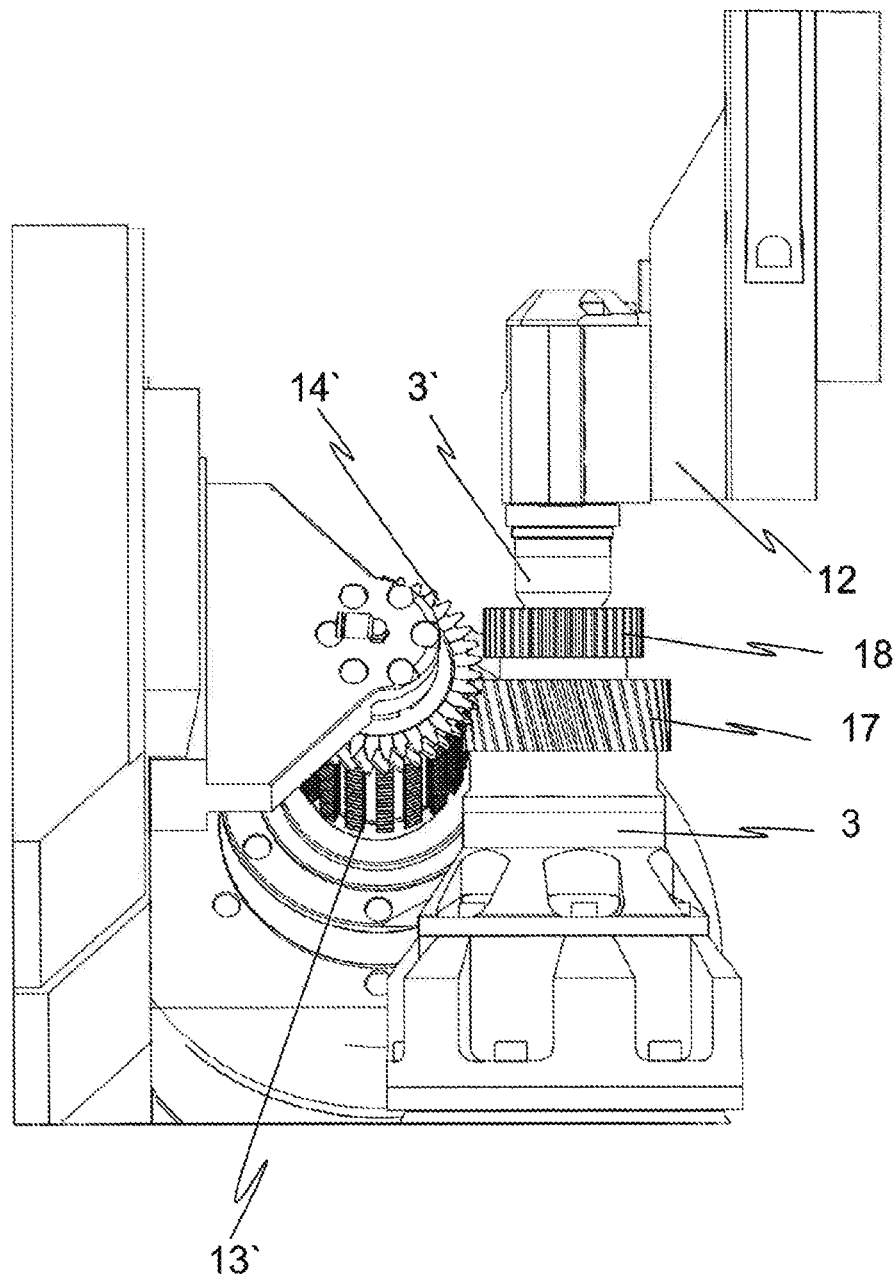
FIG. 8 depicts the gear hobbing machining of the second embodiment shown in FIGS. 6 and 7 in a side view.

The hobbing machining step of the second embodiment of the method is shown in FIGS. 6 to 8.

A hob 13' is used for the hobbing machining in the embodiment to manufacture the first gearing 17 having the larger diameter. The hob 13' rotates about the axis of rotation B1 of the tool holder 2 in generating coupling with the rotation of the workpiece 16 about the axis of rotation B2 of the workpiece holder 3. The machining head 4 is furthermore in particular guided with the hob 13 along the workpiece 16 via the linear axis Z1 in parallel with the axis of rotation B2 of the workpiece in the width direction.

The hobbing machining can, as described in the first embodiment, take place in one or more work strokes. The machining takes place in a plurality of work strokes, in particular by a rough machining and a finishing.

Alternatively to the use of a hob, a profile cutter can also be used. In this case, however, every tooth space has to be manufactured by at least one work stroke.

The axial cross angle between the axis of rotation B1 and the axis of rotation B2 substantially corresponds in the gear hobbing machining to the lead angle of the first gearing 17 or to 90° minus the helix angle of the first gearing 17, with the lead angle of the tool additionally having to be taken into account.

Figure 9:
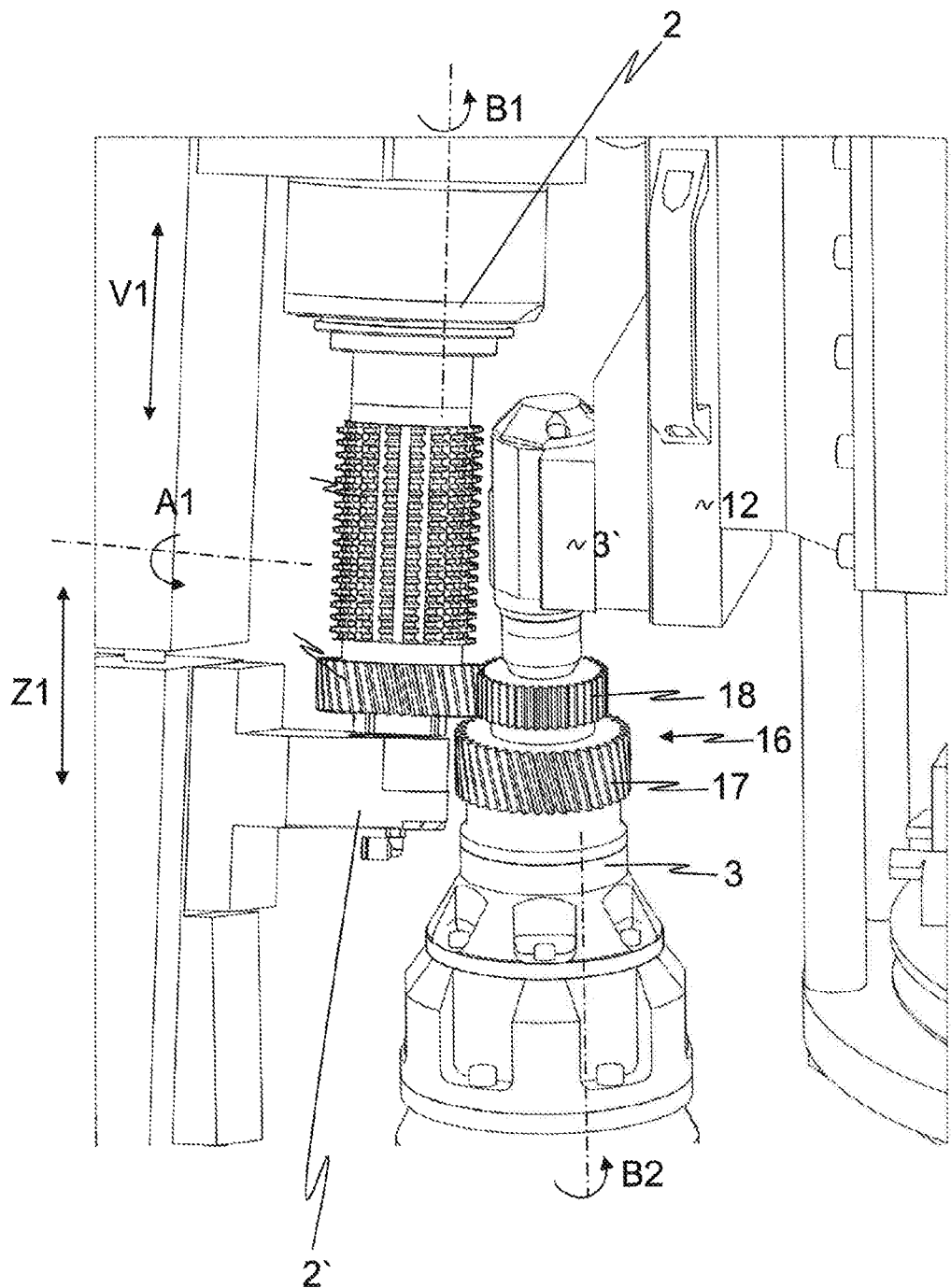
FIG. 9 depicts a gear skiving machining in the second embodiment in a perspective view.
Figure 10:
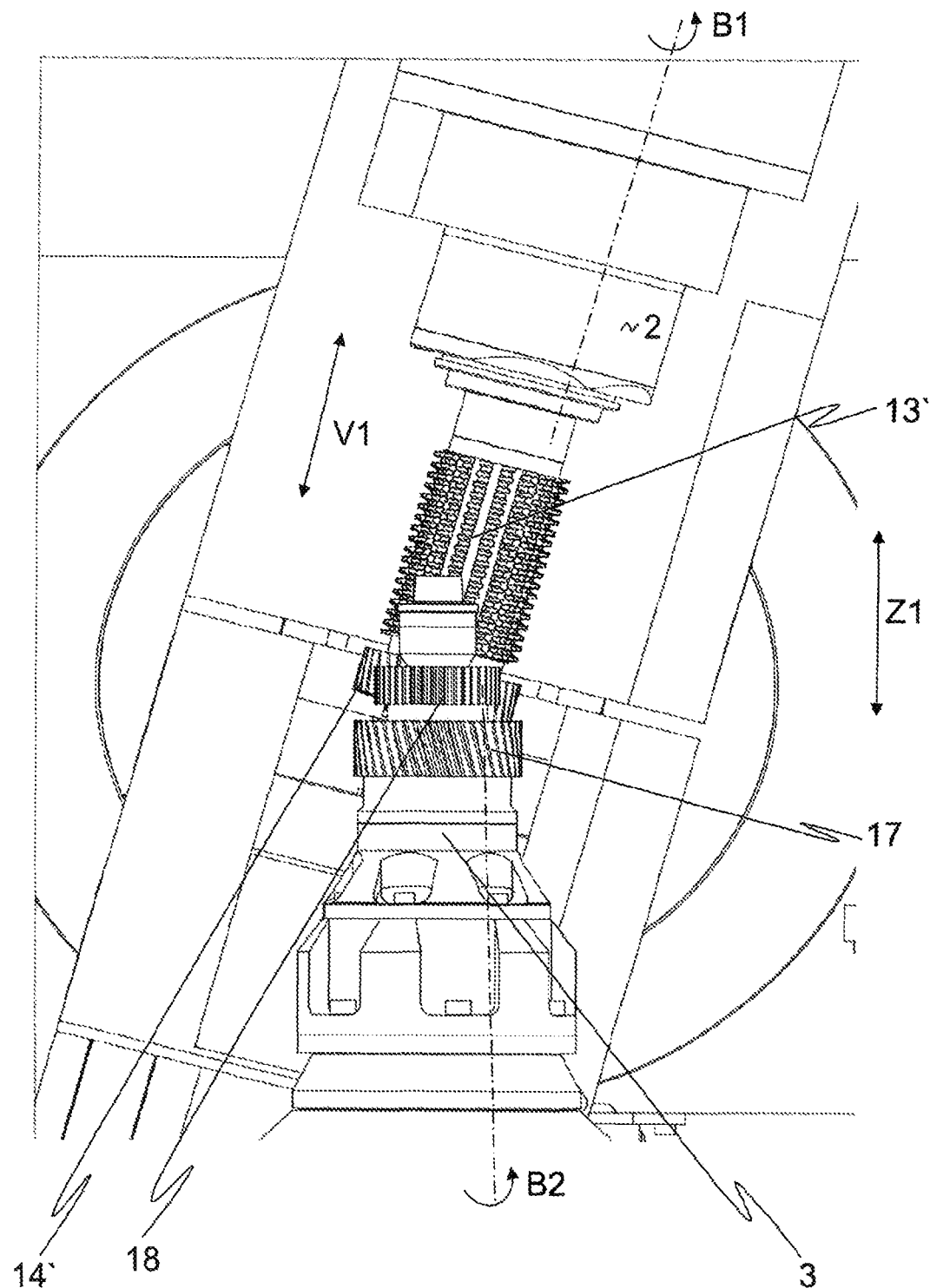
FIG. 10 depicts the gear skiving machining of the second embodiment shown in FIG. 9 in a front view.

The gear skiving machining in accordance with the second embodiment is shown in FIGS. 9 and 10. In gear skiving, as already described with respect to the first embodiment, a rotation of the gear skiving tool 14' about the B1 axis of the tool holder 2 takes place in generating coupling with the rotation of the workpiece 16 about the axis of rotation B2 of the workpiece holder 3. In addition, a feed of the machining head takes place via the linear axis Z1 in parallel with the axis of rotation B2 of the tool holder along the width of the second gearing 18.

Although the second gearing 18 in the embodiment is a straight gearing, the hobbing tool 14' is used with an axial cross angle differing from a parallel alignment between the axes B1 and B2 and has a helical gearing in this embodiment. The movement required for the gear skiving is hereby generated. The axial cross angle also does not correspond to the helix angle of the gearing and/or the gear skiving tool 14' has a different helix angle than the gearing to be manufactured to generate and/or to increase the corresponding relative movement for the gear skiving in the manufacture of helical gearing arrangements.

In the second embodiment of, there is no preferred order of the two machining steps, i.e. of the hobbing machining and of the gear skiving machining since they are used for machining different gearing arrangements.

To be able to change from the one machining step to the other, however, the machining head also has to be pivoted about the pivot axis A1 here. The exact magnitude of the required pivot movement inter alia depends on the respective helical angles of the gearing arrangements 17 and 18 and on the tool configuration.

The required pivot angle range is typically greater than 50° and can, for example, be in a range from 50° to 130°, in the range from 60° to 120°.

A shift movement is also carried out in addition to the pivot movement about the A1 axis in the second embodiment on a change between the two machining steps to bring the respective other tool into engagement with the respective gearing to be machined.

As shown in the Figures with respect to the respective methods, the workpiece holders and the tool holder each have counter-bearings so that the workpiece and the tool are clamped at two sides. This is significant with the high cutting forces occurring within the framework of the hobbing.

The counter-bearings are designed in as narrow a manner as possible to provide a corresponding freedom of movement in an axial direction for the gear skiving process.

The invention claimed is:

1. A method for gear manufacturing machining of a workpiece, comprising the steps:
    hobbing machining of the workpiece to generate a gearing geometry of the workpiece, and
    gear skiving of the workpiece,
    wherein the hobbing machining is carried out at an axial cross angle between a hobbing tool and the workpiece in a range of 90°+/−45° and the gear skiving is carried out at an axial cross angle between a skiving tool and the workpiece in a range of +/−45°.

2. The method in accordance with claim 1, wherein the hobbing machining and the gear skiving take place with a same gear cutting machine, wherein the hobbing machining and the gear skiving take place using a same fixture of the workpiece in a workpiece holder of the gear cutting machine and/or with a hobbing tool used for hobbing machining and a gear skiving tool used for gear skiving held in a same tool holder of the gear cutting machine and/or traveled by axes of a same machining head of the gear cutting machine at least on carrying out of the respective machining step.

3. The method in accordance with claim 2, wherein the hobbing tool and the gear skiving tool are fixed on a same tool arbor and/or wherein the gear cutting machine has two tool holders arranged at a machining head and/or an automatic tool changer for changing between the hobbing tool and the gear skiving tool.

4. The method in accordance with claim 2, wherein a feed movement of the hobbing tool and the gear skiving tool respectively takes place in parallel with an axis of the workpiece holder in at least one of the hobbing machining or the gear skiving, wherein a rotational movement of the workpiece holder is coupled to the feed movement and/or to a rotational movement of the tool holder.

5. The method in accordance with claim 1, wherein a machining head of the gear cutting machine is pivoted relative to an axis of a workpiece holder between the two machining steps about a pivot axis of the machining head extending perpendicular to the axis of the workpiece holder and/or an axis of a tool holder, and
    wherein the tool holder in which a tool for the hobbing machining and a tool for the gear skiving are held is shifted between the two machining steps relative to the workpiece via a slide of the machining head supporting the tool holder travelable in parallel with an axis of rotation of the tool holder and/or via two axes of movement of the machining head supporting the tool holder extending perpendicular to the pivot axis.

6. The method in accordance with claim 1, wherein the hobbing machining takes place at a non-hardened workpiece and/or is at least used for roughing machining of a gearing from a blank of the workpiece and/or wherein the gear skiving takes place at the non-hardened workpiece and/or is at least used for a finishing of the gearing.

7. The method in accordance with claim 1, wherein the hobbing machining and the gear skiving are used for manufacturing a same gearing, with a roughing machining for manufacturing the gearing first carried out, and following on from this a gear skiving machining for finishing the gearing is carried out at a toothed workpiece.

8. The method in accordance with claim 7, wherein the gearing is a worm gearing.

9. The method in accordance with claim 8, wherein the hobbing machining takes place using a disc-shaped profile cutter that rotates independently of rotational movement of a workpiece holder, with the profile cutter traveled in parallel with an axis of the workpiece holder during the hobbing machining while the workpiece is rotated about its axis such that the profile cutter generates a worm thread and/or wherein the hobbing machining takes place at an axial cross angle dependent on a lead angle of the worm gearing, with the axial cross angle approximately corresponding to the lead angle.

10. The method in accordance with claim 9, wherein the hobbing machining is carried out at an axial cross angle between a hobbing tool and the workpiece in a range from +/−5° and +/−40°.

11. The method in accordance with claim 8, wherein the gear skiving takes place by generating a coupling between a gear skiving tool and the workpiece and the gear skiving tool is traveled in parallel with an axis of a workpiece holder during gear skiving, with the gear skiving tool having a step cut and/or wherein the gear skiving takes place at an axial cross angle differing from 90°, with an angle of the step cut and/or the difference of the axial cross angle from 90° approximately corresponding to a lead angle.

12. The method in accordance with claim 11, wherein the gear skiving is carried out at an axial cross angle between a hobbing tool and the workpiece in a range of 90°+/−40°.

13. The method in accordance with claim 1, wherein the hobbing machining and the gear skiving are used for manufacturing two different gearings of the workpiece, with the hobbing machining carried out for manufacturing a first gearing and with the gear skiving carried out for manufacturing a second gearing.

14. The method in accordance with claim 13, wherein the first and second gearings are spur gearings, in particular a shaft having at least two spur gearing arrangements arranged next to one another, having different diameters and/or wherein the first and the second gearing have an interference contour close to an end side of one of the gearings.

15. The method in accordance with claim 1, wherein the hobbing machining takes place by a hob whose rotational movement is coupled to a rotational movement of a workpiece holder, with the hob traveled in parallel with an axis of the workpiece holder during the hobbing machining;
and/or wherein the gear skiving takes place by generating a coupling between a gear skiving tool and the workpiece and the gear skiving tool is traveled in parallel with the axis of the workpiece holder during the gear skiving.

16. A gear cutting machine comprising a workpiece holder and a tool holder that is travelable via movement axes of the gear cutting machine with respect to the workpiece holder, with the tool holder arranged at a machining head of the gear cutting machine that is travelable over the movement axes of the gear cutting machine, with the gear cutting machine having a control with software for controlling the movement axes of the gear cutting machine, the software comprising instructions for hobbing machining the workpiece to generate a gearing geometry of the workpiece and gear skiving the workpiece, wherein the hobbing machining is carried out at an axial cross angle between a hobbing tool and the workpiece in a range of 90°+/−45° and the gear skiving is carried out at an axial cross angle between a skiving tool and the workpiece in a range of +/−45°.

17. The gear cutting machine of claim 16, wherein the machining head of the gear cutting machine having the tool holder has a pivot axis that stands perpendicular on an axis of the workpiece holder, with the pivot axis having a pivot angle of more than 90°, or wherein an axis of the tool holder is pivotable by the pivot axis of the machining head in a range from −20° to +90° relative to the axis of the workpiece holder.

18. Software for controlling a gear cutting machine, the gear cutting machine comprising a workpiece holder and a tool holder that is travelable via movement axes of the gear cutting machine with respect to the workpiece holder, with the tool holder arranged at a machining head of the gear cutting machine that is travelable over the movement axes of the gear cutting machine, the software having a function for carrying out hobbing machining of a workpiece to generate a gearing geometry of the workpiece, and gear manufacturing machining of the workpiece by gear skiving, the software comprising instructions for hobbing machining the workpiece to generate a gearing geometry of the workpiece and gear skiving the workpiece, wherein the hobbing machining is carried out at an axial cross angle between a hobbing tool and the workpiece in a range of 90°+/−45° and the gear skiving is carried out at an axial cross angle between a skiving tool and the workpiece in a range of +/−45°.

19. A method for gear manufacturing machining of a workpiece, comprising the steps:
hobbing machining of the workpiece to generate a gearing geometry of the workpiece, and
gear skiving of the workpiece,
wherein the hobbing machining takes place at a first axial cross angle between a hobbing tool and the workpiece and the gear skiving takes place at a second axial cross angle between the tool and the workpiece, with a difference between the first and second axial cross angles amounting to more than 45° and less than 135°.

20. The method in accordance with claim 19, wherein a tool holder in which the hobbing tool and the skiving tool are held is shifted between the two machining steps relative to the workpiece, via a slide of a machining head supporting the tool holder travelable in parallel with an axis of rotation of the tool holder and/or via two axes of movement of the machining head supporting the tool holder extending perpendicular to a pivot axis of the machining head.

* * * * *